(12) United States Patent
Triplett et al.

(10) Patent No.: US 11,892,758 B1
(45) Date of Patent: Feb. 6, 2024

(54) CAMERA LOCATION APPARATUS

(71) Applicant: Camera Source, LLC, Muskego, WI (US)

(72) Inventors: Christopher T. Triplett, Muskego, WI (US); Kevin Pitterle, Watertown, WI (US)

(73) Assignee: Camera Source, LLC, Muskego, WI (US)

( * ) Notice: Subject to any disclaimer, the term of this patent is extended or adjusted under 35 U.S.C. 154(b) by 0 days.

(21) Appl. No.: 18/076,789

(22) Filed: Dec. 7, 2022

(51) Int. Cl.
*G03B 17/56* (2021.01)

(52) U.S. Cl.
CPC ................... *G03B 17/561* (2013.01)

(58) Field of Classification Search
CPC .... G03B 17/56; G03B 17/561; G03B 17/566; F16M 13/00; F16M 13/02; F16M 13/022; F16M 11/20; F16M 11/2007; F16M 11/2021; F16M 11/2028
See application file for complete search history.

(56) References Cited

U.S. PATENT DOCUMENTS

| | | | |
|---|---|---|---|
| 7,609,961 B2 | 10/2009 | Park | |
| 8,998,512 B1 | 4/2015 | Celler | |
| 9,150,165 B1 | 10/2015 | Fortin et al. | |
| 10,625,689 B2 | 4/2020 | Yang | |
| 10,887,556 B2 | 1/2021 | Diaz et al. | |
| 11,453,351 B1 | 9/2022 | Triplett et al. | |
| 2017/0072856 A1* | 3/2017 | Varick | B60R 11/04 |
| 2021/0016846 A1* | 1/2021 | Fischer | B62D 43/005 |
| 2021/0132475 A1 | 5/2021 | Sickler et al. | |

FOREIGN PATENT DOCUMENTS

| | | | |
|---|---|---|---|
| CN | 209524290 U | * | 10/2019 |
| JP | 2010018138 A | | 1/2010 |
| JP | 2010173542 A | | 8/2010 |
| KR | 100693316 B1 | | 3/2007 |
| KR | 100908448 B1 | * | 7/2009 |
| KR | 20100094704 A | | 8/2010 |

OTHER PUBLICATIONS

Camera Source, LLC, "Factory camera relocation housing kit-Adjustable-COMING SOON!", https://camerasource.com/factory-camera-relocation-housing-kit-adjustable.html, website accessed Oct. 9, 2021, published Mar. 19, 2021.
Zorg North America LLC, "Multi-Vehicle LVDS Camera Relocation Kit", https://www.zorg-na.com/product/4210/ , Accessed Oct. 9, 2021.

* cited by examiner

*Primary Examiner* — Clayton E. LaBalle
*Assistant Examiner* — Fang-Chi Chang

(57) ABSTRACT

A camera location apparatus, system, and method is disclosed which includes a camera housing configured to at least partially enclose a camera, the camera housing attached to an extension via a bracket, wherein the extension is configured to extend through a tire rim and secure to a tire carrier and the bracket is configured to allow the camera housing to rotate in relation to the extension.

16 Claims, 8 Drawing Sheets

CAMERA LOCATION APPARATUS

BACKGROUND OF THE INVENTION

1. Field of the Invention

Embodiments of the present disclosure relate generally to cameras secured to a vehicle mounted tire carrier.

2. Background

Many vehicles, such as automobiles and trailers, include a camera mounted to the rear of the vehicle (commonly called a backup camera) which is configured to operate with an electronic system to display what is viewable by the camera to a user inside the vehicle. These cameras are useful in a variety of applications, such as to assist a user in backing a vehicle up or in viewing blind spots. For a variety of reasons, vehicle owners may desire to add a accessories, such as a spare tire carrier, to the vehicle. However, these accessories are commonly attached to the rear of a vehicle, such as via a trailer hitch. As a result, the accessory often blocks the rear mounted camera, rendering it useless in its original location. As such, it would be desirable to provide a solution which allows a camera on a vehicle to be located in a position which allows it to operate as desired as well as to accommodate an accessory.

SUMMARY OF THE INVENTION

The invention relates, in one embodiment, to an apparatus configured to attach a camera to a vehicle (or to relocate an existing one to a new location) in order to accommodate an accessory mounted to the vehicle, such as a tire carrier, which is often mounted to the rear of a vehicle. The apparatus includes a camera housing configured to at least partially enclose a digital or analog camera; a bracket attached to the camera housing; and an extension configured to secure to the bracket, extend through a tire rim, and secure to a vehicle accessory (in this case a tire carrier). The bracket is further configured to secure to the extension and to allow rotation of the camera housing in relation to the extension. The bracket may also include a first and second protrusion configured to sandwich a portion of the camera housing, wherein a fastener connects the first protrusion, second protrusion, and the portion of the camera housing together. The bracket may further include a fin and a hook configured to secure to the bracket to the extension.

The invention relates, in another embodiment, to a system including an extension configured to extend through a tire rim and secure to a tire carrier, a camera housing configured to at least partially enclose a digital or analog camera, a bracket attached to the extension and configured to secure to the camera housing, and a digital camera or an analog camera at least partially enclosed by the camera housing. The camera bracket allows angle adjustment of the camera housing along at least one axis.

The invention relates, in another embodiment, to a method for attaching a camera to a tire carrier on a vehicle including attaching an extension configured to extend through a tire rim to a tire carrier, attaching a bracket to the extension, enclosing at least a portion of a camera within a camera housing, and attaching the camera housing to the bracket in a way which allows the camera housing to rotate about the extension.

DETAILED DESCRIPTION OF THE INVENTION

Figure 1:
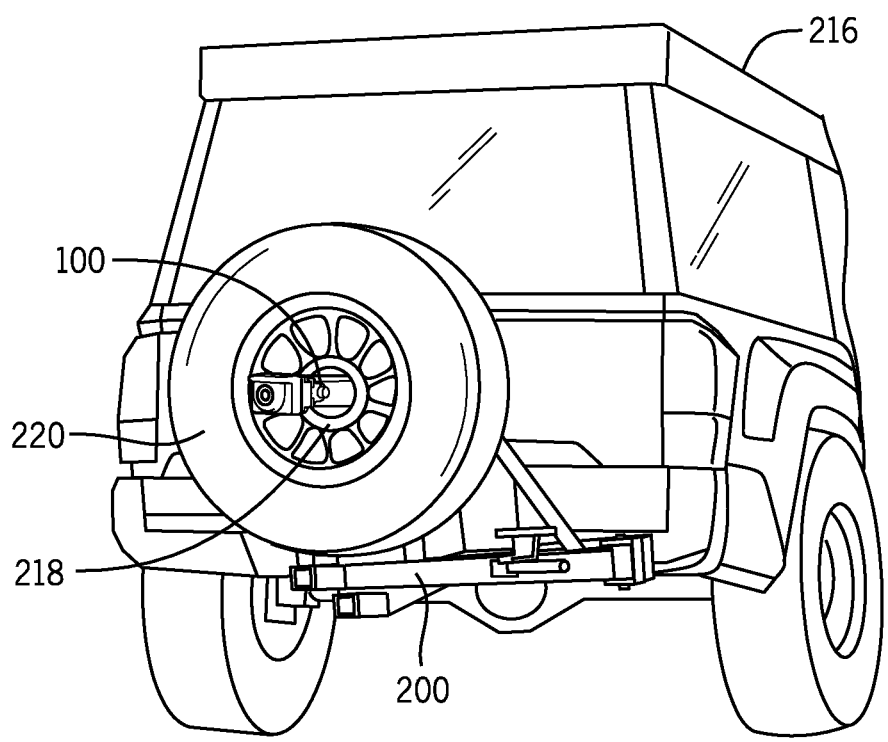
FIG. 1 is a rear perspective view of an embodiment of the present invention.

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified. Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. As used herein, the term "fastener" is intended to mean a screw, bolt, nail, rivet, anchor, pin, and any other type used to secure one object to another.

A camera location apparatus, method and system will now be described with references in FIGS. 1-11. Turning to the drawings, where the reference characters indicate corresponding elements throughout the several figures, attention is first directed FIG. 1, where a rear perspective view of an embodiment of the camera location apparatus is shown, illustrating its composition and the apparatus is generally indicated by reference character 100. Camera location apparatus 100 is configured to attach to a tire carrier 200 (such as a trailer hitch mounted unit) on a vehicle 216 and extend through a rim 218 of a tire 220 mounted to the tire carrier 200, thereby allowing a user to utilize camera location apparatus 100 to view what is behind the vehicle without have to turn around or get out of the vehicle.

Figure 2:
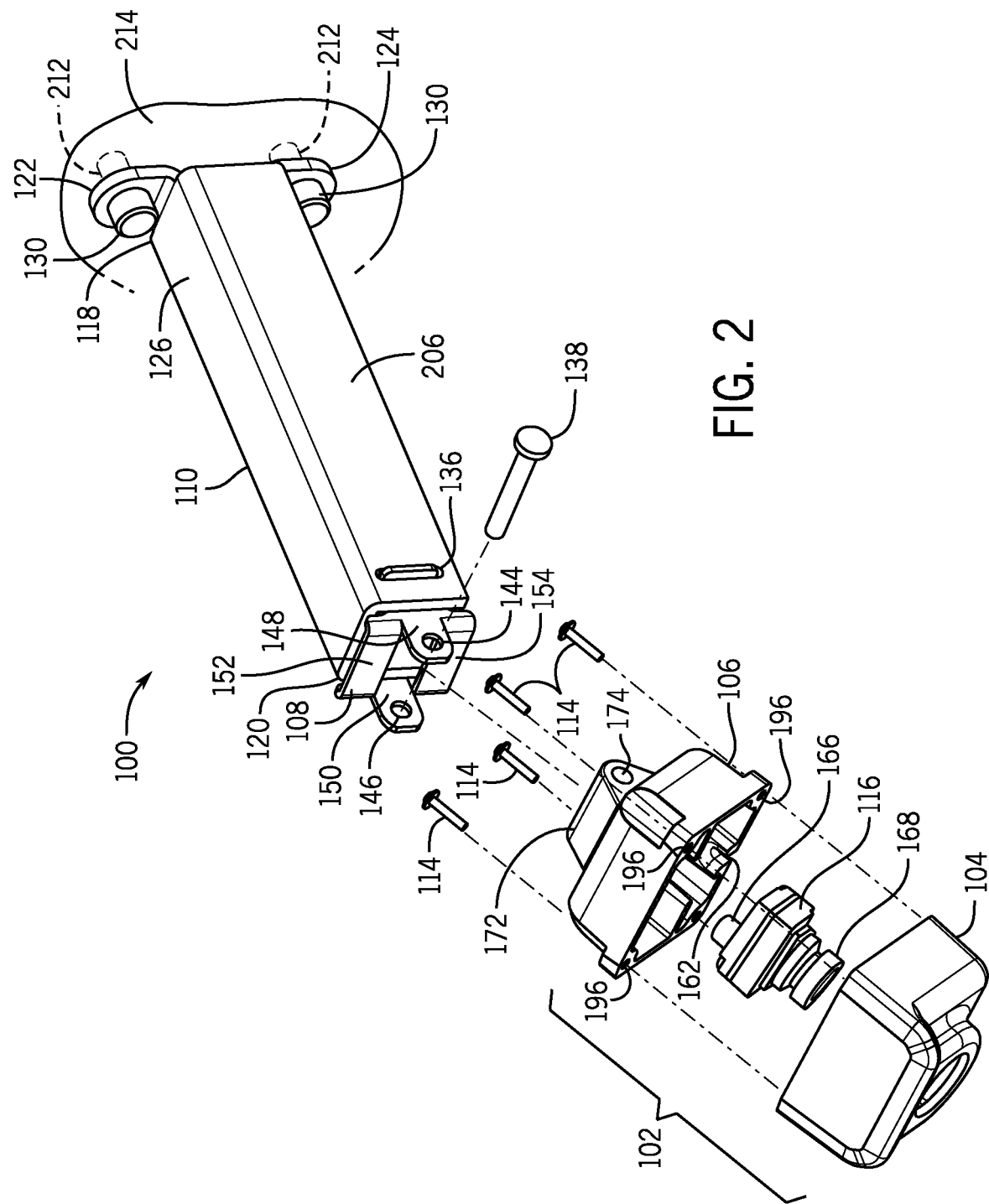
FIG. 2 is a partially exploded view of an embodiment of the present invention with a camera.

Turning to FIG. 2, a partially exploded view of an embodiment of camera location apparatus 100 with a camera 116 is shown. Camera location apparatus 100 comprises a camera housing 102, a camera bracket 108, and an extension 110 configured to extension through rim 218 (preferably the center thereof) of tire 220. Camera housing 102 is generally square or rectangular shaped and further comprises a front housing 104 and a rear housing 106 configured to enclose at least a portion of digital or analog camera 116. Camera 116 comprises at least a body 252 and lens 168 (see FIGS. 10-11). Front housing 104 and rear housing 106 are secured together by at least one first fastener 114, but in the current embodiment four. Camera bracket 108 is configured to attach to rear housing 106 and to also secure to extension 110. Extension 110 comprises a top rail 126, a left side rail 204 (see FIG. 3), and a right side rail 206 which form a cross sectional "U" shape along the length of extension 110. It should be noted that extension 110 may be different cross-sectional shape if desired such as square, circular, triangular, or other shape which extends through rim 218. Extension 110 further comprises a first end 118 configured to attach to a tire mount plate 214 attached to tire carrier 200, and a second end 120 located opposite of first end 118 and configured to attach to bracket 108. Tire mount plate 214 is configured to attach at least tire 220 to tire carrier 200. First end 118 further comprises a first flange 122 extending perpendicular to, and away from, top rail 126, wherein first flange 122 is connected to a second flange 124 (via rear surface 202 described below, see FIG. 4) extending perpendicular to, and away from, top surface 126 in an opposite direction of first flange 122. First flange 122 comprises a first flange aperture 132 formed therethrough and configured to receive a second fastener 130 which secures extension 110 to tire mount plate 214. Additionally, second flange 124 comprises a second flange aperture 134 formed therethrough and also configured to receive a second fastener 130 which further secures extension 110 to tire mount plate 214. Second end 120 of extension 110 (specifically in right side rail 206) further comprises a slot 136 configured to receive bracket 108 in order to at least partially secure bracket 108 (and thus camera housing 102) to extension 100. Mount plate 214 is configured to also attach to rim 218 of tire 220 to secure tire 220 to tire carrier 200. Mount plate 214 is configured to receive each second fastener 130, thereby securing extension 110 it. Extension 110 is currently about 5 inches long however its length may be adjusted to be compatible with a desired accessory/tire carrier 200 and tire 220.

Rear camera housing 106 further comprises a protuberance 172 with a through hole 174 formed therethrough and configured to receive a third fastener 138 which connects rear camera housing 106 to bracket 108. Bracket 108 further comprises a first projection 148 with a first orifice 144 formed therethrough and a second projection 150 with a second orifice 146 formed therethrough, wherein first projection 148 and second projection 150 are configured to sandwich protuberance 172 and to align through hole 174 with first orifice 144 and second orifice 146 to allow third fastener 138 to extend through first orifice 144, through hole 174, and second orifice 146 to secure rear camera housing 106 to bracket 108 (and thus to extension 110). In the current embodiment first orifice 144 and second orifice 146 are threaded and third fastener 138 is a screw configured to screw into both orifices wherein rear camera housing 106 may be rotated to a desired angle and then secured in place by tightening first orifice 144 and second orifice 146 against protuberance 172 via third fastener 138. However, it is contemplated that first orifice 144 and second orifice 146 may be configured to allow third fastener 138 to secure bracket 108 and rear camera housing 106 together in other ways, such as by using a different type of fastener, through hole 174 could alternatively be threaded instead of first orifice 144 and second orifice 146, and/or more than one fastener may be used.

Figure 3:
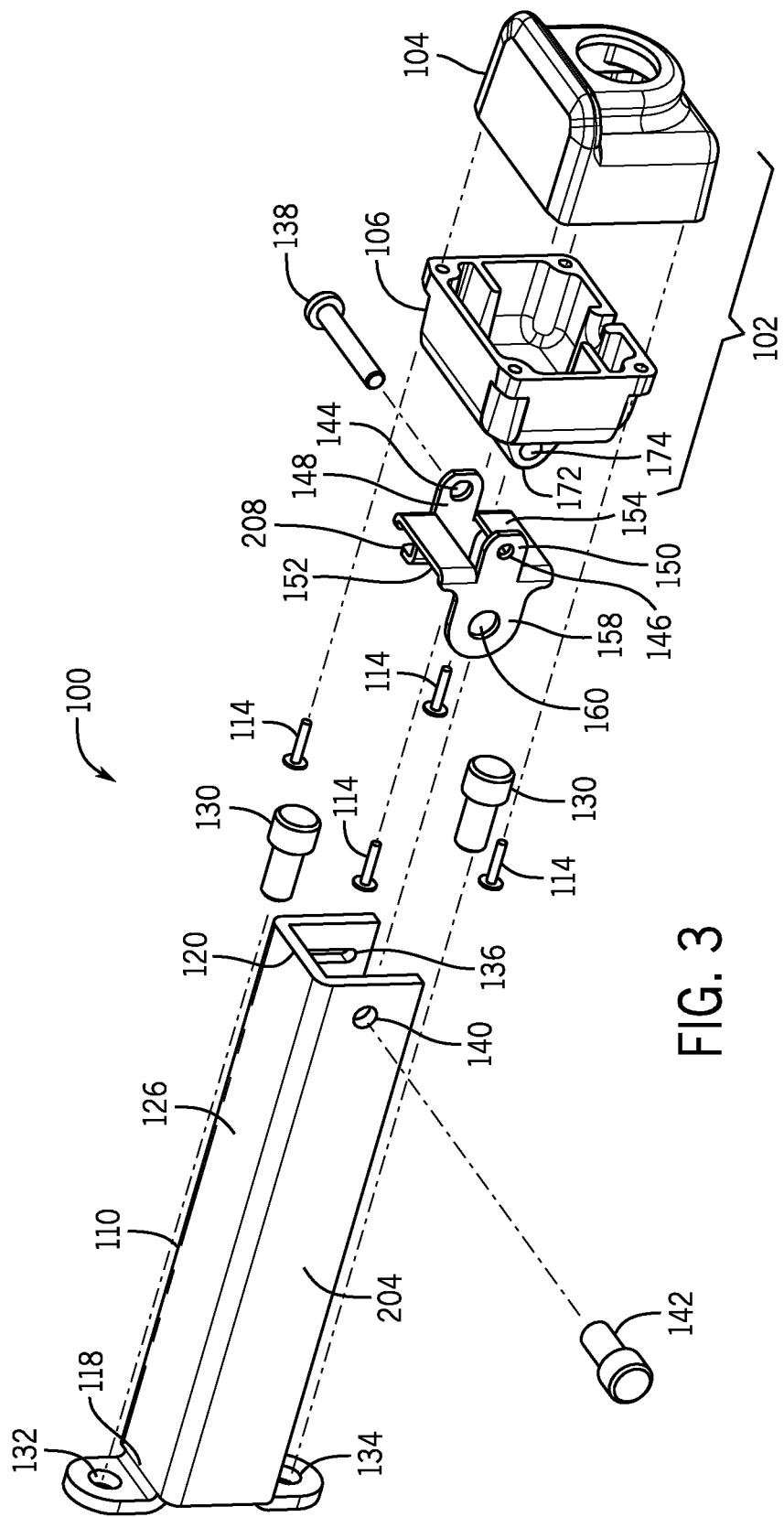
FIG. 3 is an exploded view of an embodiment of the invention.

Turning to FIG. 3, an exploded view of an embodiment of camera location apparatus 100 is shown. Bracket 108 further comprises a first cross brace 152 which is connected on one end to first projection 148 and on the other end connected to second projection 150, thereby extending perpendicular to, and between, first projection 148 and second projection 150. First cross brace 152 is also located above first projection 148 and second projection 150. In addition, bracket 108 further comprises a second cross brace 154 configured in the same manner as first cross brace 152 except second cross brace 154 is located below first projection 148 and second projection 150. Bracket 108 further comprises a fin 158 which is connected to, and coplanar with, second projection 150, wherein fin 158 extends in the opposite direction of second projection 150. Fin 158 further comprises a first opening 160 configured to communicate with a fourth fastener 142. Fourth fastener 142 secures bracket 108 to extension 110 by extending through an eye 140 formed therethrough the left side rail 204 on the second end 120 of extension 110. Eye 140 may be threaded so fourth fastener 142 secures into and/or through eye 140. In addition, first opening 160 is larger in diameter than second orifice 146 (but does not have to be) and may be threaded to allow fastener 142 to secure into and/or through opening 160.

Figure 4:
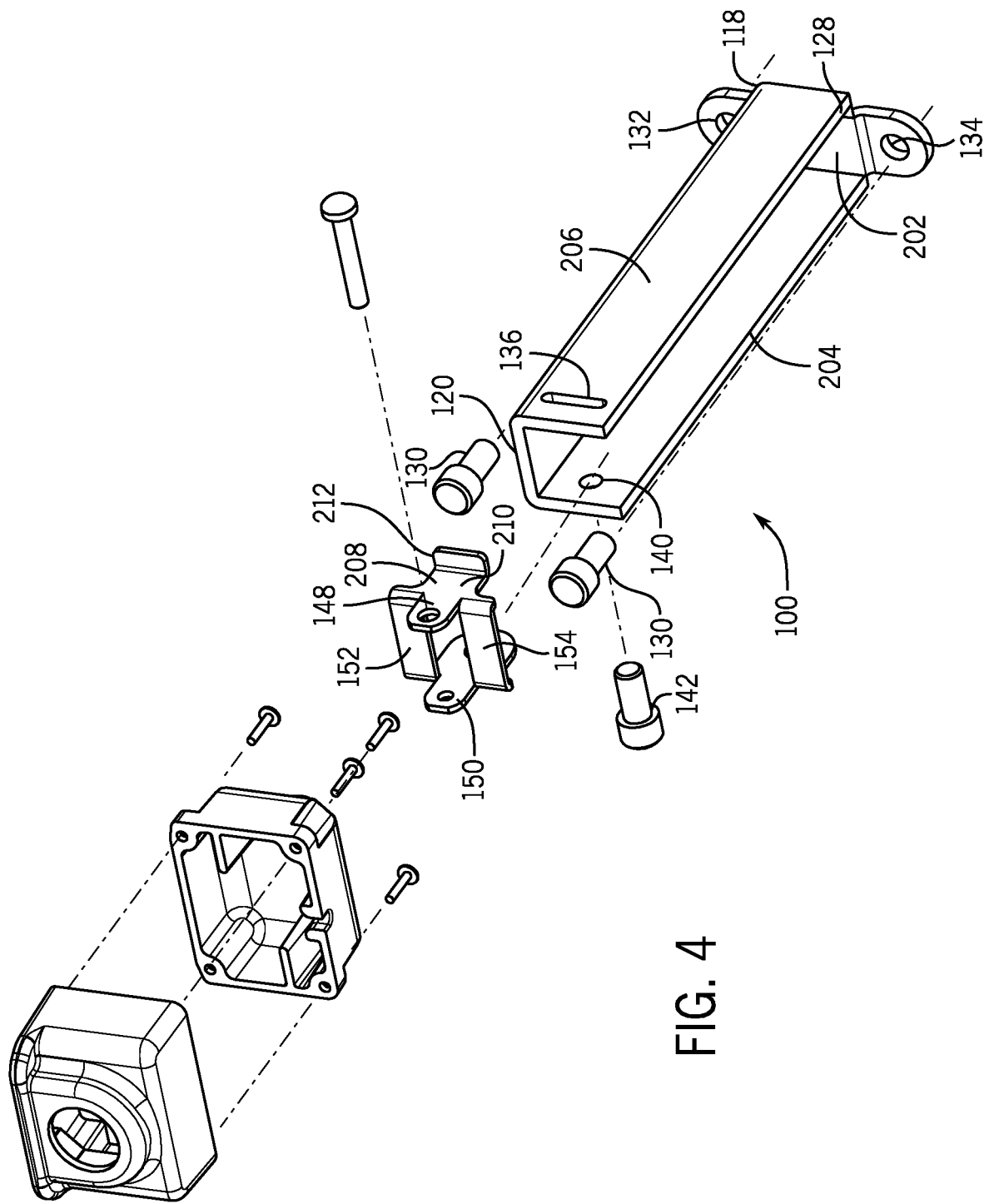
FIG. 4 is an alternative exploded view of an embodiment of the invention.

Turning to FIG. 4, an alternative exploded view of an embodiment of camera location apparatus 100 is shown. First projection 148 of bracket 108 further comprises a hook 208 which is configured to communicate with slot 136 of extension 110 in order to provide additional securement of bracket 108 to extension 110. Hook 208 is comprised of a plate 210 and a plate 212. Plate 210 is connected to first projection 148 and inline therewith. Plate 210 extends perpendicular to, and away from (behind) first projection 148, first cross brace 152 and second cross brace 154. Plate 210 is also connected to protrusion 212 which is perpendicular to plate 210 and extends parallel with, and away from, first cross member 152 and second cross member 154. To secure bracket 108 to extension 110, protrusion 212 of hook 208 is slid into slot 136 of extension 110, then first opening 160 of fin 158 is aligned with eye 140 of extension 110 and fourth fastener 142 is secured through eye 140 and first opening 160. While eye 140 and hook 208 secure bracket 108 to extension 110 (via fourth fastener 142) to protect against bracket 108 from due to normal vibration and jostling due to vehicle use, it is contemplated that eye 140 and hook 208 could utilize other connection types such as press fit, clip, snap fit, adhesive, or formed integral with extension 110. While in the current embodiment first projection 148, second projection 150, fin 158, hook 208 first cross brace 152, and second cross brace 154 are formed integral with each other, it is contemplated that the elements may be separate and secured together and/or comprise the same or different materials. Further, first end 118 of extension 110 may further comprise a rear surface 202 connected to first flange 122 and second flange 124, top rail 126, left side rail 204, and right side rail 206 and configured to add strength to extension 110. Rear surface 202 is preferably made from the same material as extension 110, first flange 122, and second flange 124, and bracket 108 such as metal or plastic, but other rigid or semi-rigid materials may be utilized. Likewise, camera housing 102 may also be made of metal or plastic, but other rigid or semi-rigid materials may be utilized.

Figure 5:
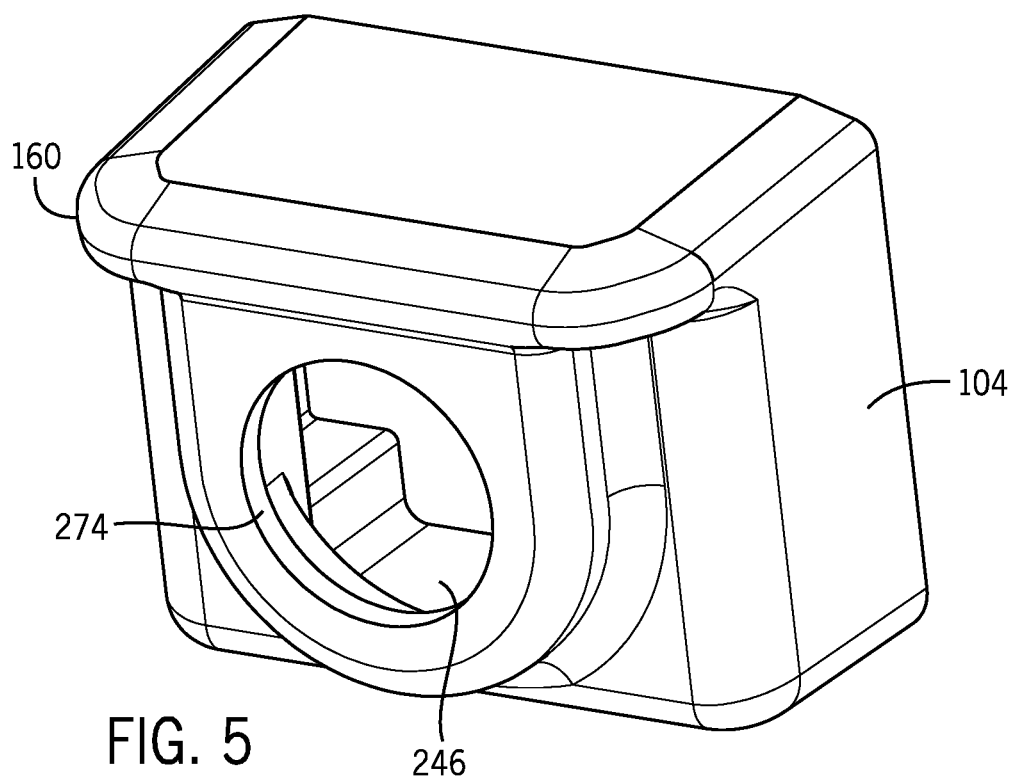
FIG. 5 is a perspective view of an embodiment of front camera housing 104.

Turning to FIG. 5, a perspective view of an embodiment of front camera housing 104 is shown. Front camera housing 104 further comprises aperture 274 formed therethrough the front of camera housing 104 and is configured to allow lens 168 of camera 116 to extend through it so that camera 116 may operate as desired. Front camera housing 104 further comprises a hood 160 located around the top of front camera housing 104, and extends away from the front, at least a portion of the right side, and at least a portion of the left side of the housing. Hood 160 is configured to keep rain and debris away from lens 168, which may otherwise obscure the view from the lens. In the current embodiment hood 160 is rounded, but it may be any desired shape which performs the same stated purpose. Front camera housing 104 (and rear camera housing 106) is preferably opaque in order to reduce or eliminate glare or lens flare occurring in the viewable image produced by camera 116.

Figure 6:
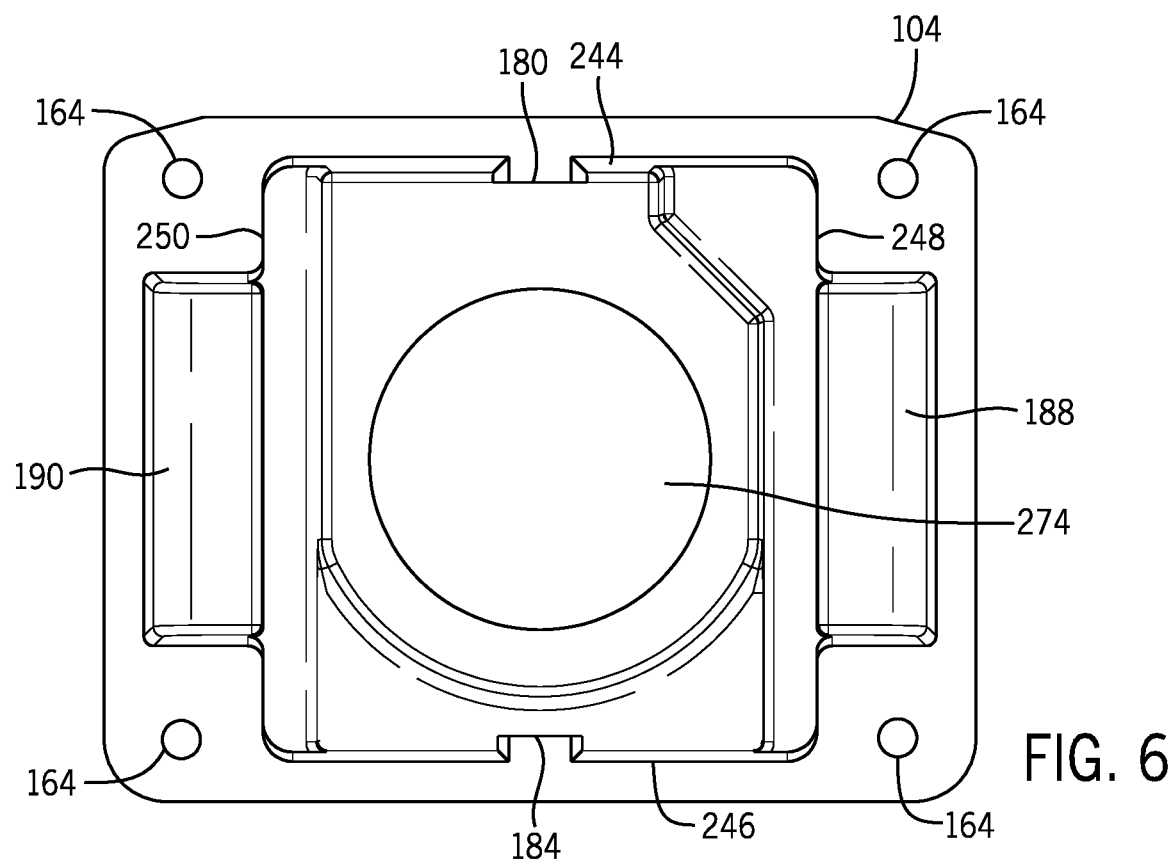
FIG. 6 is a rear view of an embodiment of front camera housing 104.
Figure 7:
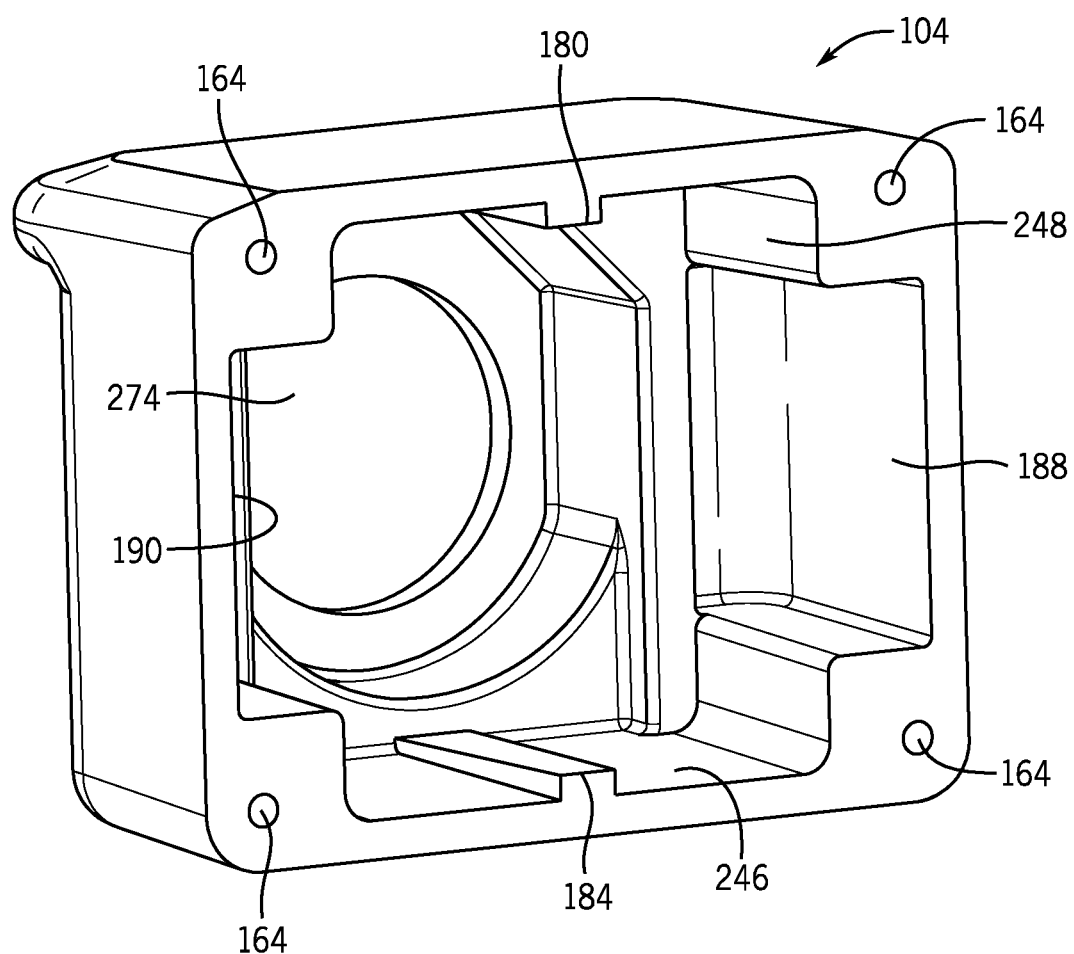
FIG. 7 is a rear perspective view of an embodiment of front camera housing 104.

Turning to FIGS. 6 and 7, a rear view and a rear perspective view of an embodiment of front camera housing 104 is shown. Front camera housing 104 further comprises one receptacle 164 located near each corner of housing 104 (four in the current embodiment) and configured to receive a first fastener 114 to secure front camera housing 104 and rear camera housing 106 together. Front camera housing 104 further comprises a first standoff 180 centrally located on a top interior wall 244 of front camera housing 104 and a second standoff 184 centrally located on a bottom interior wall 246 of front camera housing 104. First standoff 180 is in line with second standoff 184, wherein first standoff 180 and second standoff 184 are configured to be in communication with camera 116 (via body 252), thereby stabilizing camera 116 within front camera housing 104. First standoff 180 and second standoff 184 may also be tapered if desired to accommodate a friction fit between camera 116 and front camera housing 104. Front camera housing 104 may further comprises a left receptacle 188 cut into the interior of a left wall 248 of housing 104 and a right receptacle 190 cut into the interior of a right wall 250 of housing 104, both configured to communicate with at least a portion of camera 116.

Figure 8:
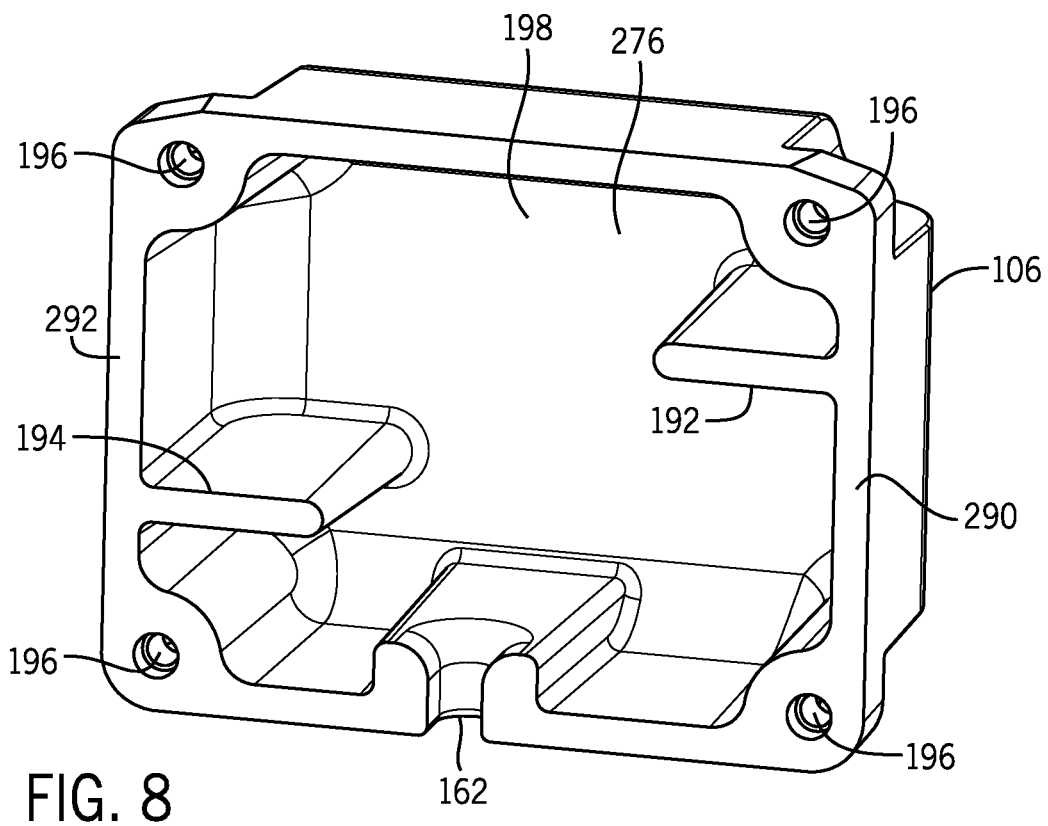
FIG. 8 is a rear perspective view of an embodiment of rear camera housing 106.
Figure 9:
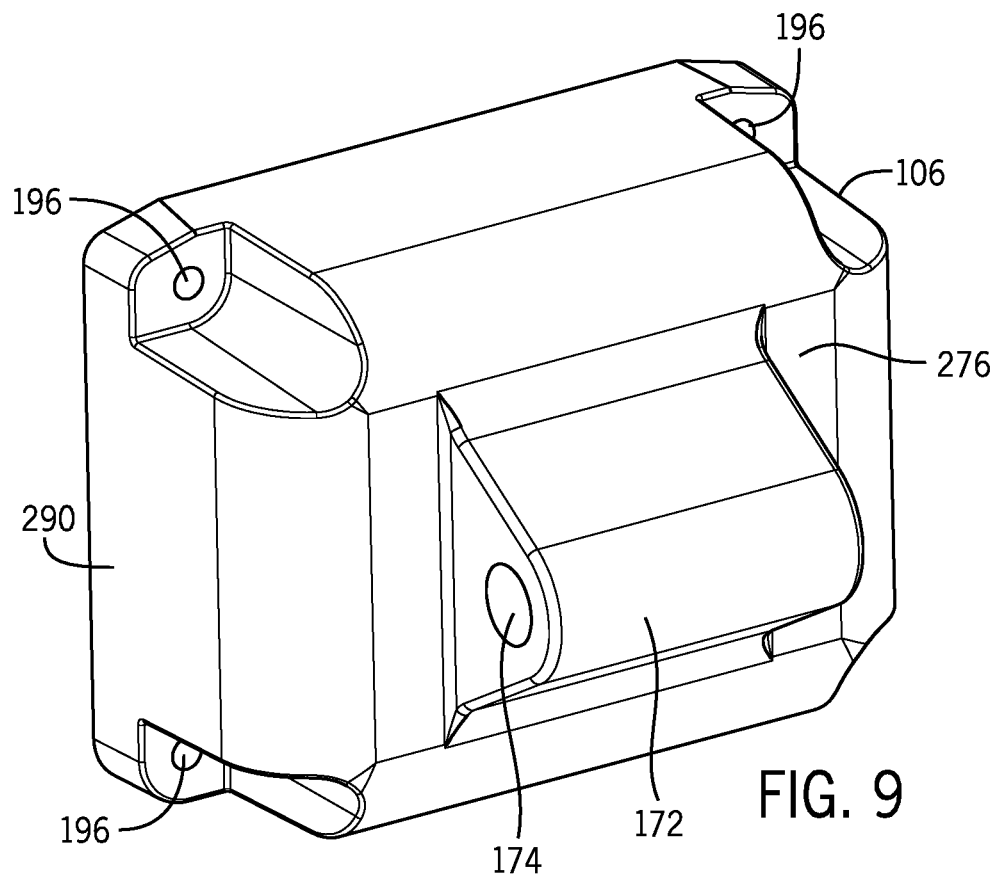
FIG. 9 is a perspective view of an embodiment of rear camera housing 106.

Turning to FIGS. 8 and 9, a rear perspective view and a perspective view of an embodiment of rear camera housing 106 is shown. Housing 106 further comprises cavity 198 defined partially by rear wall 276, wherein cavity 198 is configured to receive a rear portion of camera 116 and in the current embodiment is generally a rectangular shape, although other configurations are contemplated to accommodate different camera types (as well as overall different configurations of camera housing 102 pursuant to each camera type). In addition, rear housing 106 also includes a right divider 192 connected to, and extending away from, an interior surface of a first side wall 290 of rear housing 106, and a left divider 194 extending from an interior surface of a second side wall 292 that is opposite from first interior wall 290. Both right divider 192 and left divider 194 are offset from one another and both extend perpendicular to the interior wall they are connected to (but are not required to be). Right divider 192 and left divider 194 are configured to communicate with camera 116 in order to secure camera 116 (via body 252) within rear camera housing 106 from movement when front housing 104 and rear camera housing 106 are connected. It is contemplated right divider 192 and left divider 194 may change in size, location, and orientation, or may be removed if desired to fit a particular embodiment of camera 116 within rear housing 106. Rear housing 106 further includes at least one passage 196 located near each corner of housing 106 and configured to align with a corresponding receptacle 164 of front camera housing 104 so a first fastener 114 can extend through each passage 196 and into each corresponding receptacle 164, thereby securing front camera housing 104 and rear camera housing 106 together to enclose and protect at least a portion of camera 116, although other embodiments may include a hinge, clasp, interference fit, or other manners known to connect two parts of a housing together. Further, camera 116 may connect via a plug 166 (see FIGS. 10-11) to a cable (not shown) which extends from the back of camera 116 through an egress 162 cut therethrough the bottom of rear housing 106 and configured to allow the cable to pass through it wherein the cable extends to connect to a displaying mechanism, such as an LCD display. While egress 162 is shown in one location, egress 162 may be located in any location in rear housing 104. Egress 162 may also be configured to allow liquid and debris drainage to prevent potential damage to camera 116 caused by inclement weather.

As shown in FIG. 9, protuberance 172 is generally curvilinear with flat sides and attached to the outside of the rear wall 276 of rear camera housing 106. While protuberance is presently formed integral with rear wall 276, it could be separate and secured or adhered to rear wall 276. Protuberance 172 is currently formed integral with, and extends away from, the outside of rear wall 276 of rear camera housing 106 a distance which allows camera housing 102, when connected to bracket 108 to rotate at least 45 degrees upward and downward from a horizontal base position where camera housing 102 is parallel with extension 110.

Figure 10:
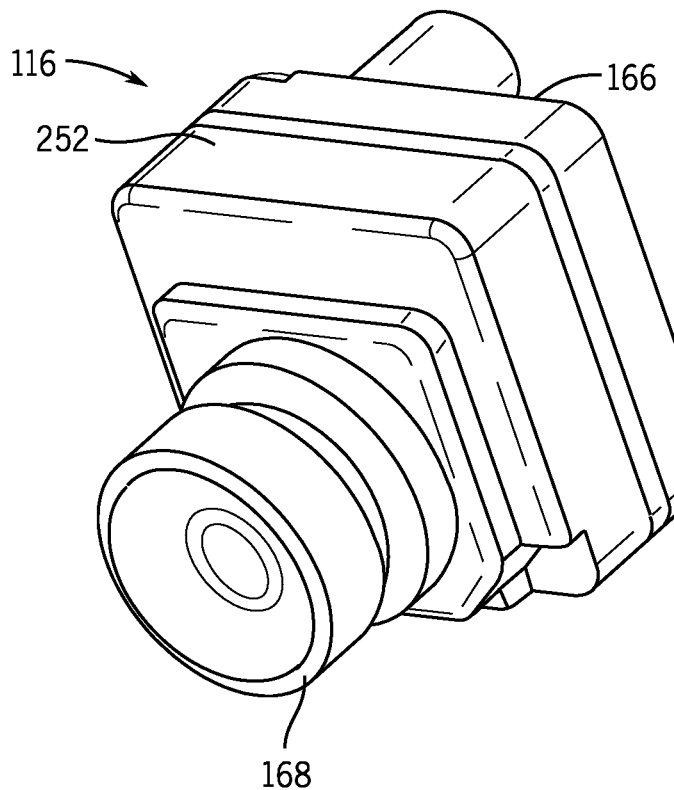
FIG. 10 is a perspective view of embodiment of camera 116.
Figure 11:
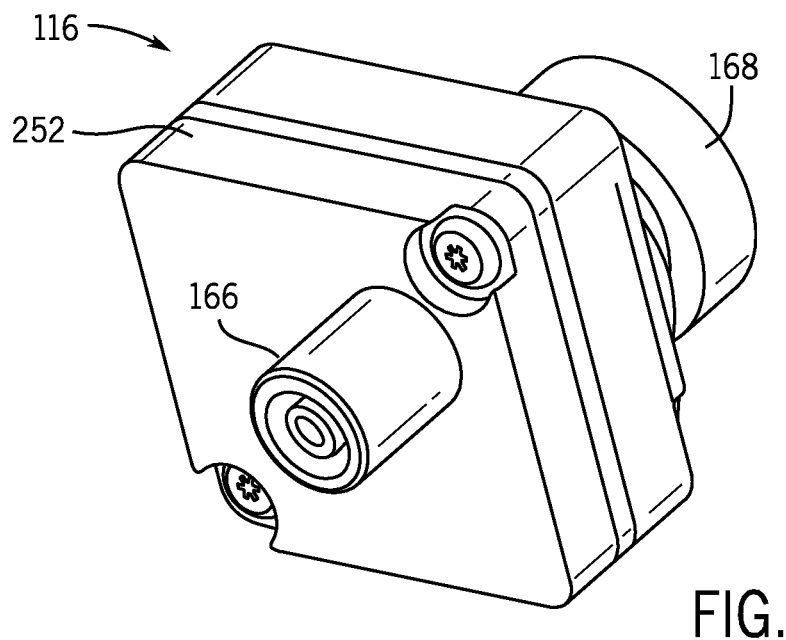
FIG. 11 is a rear perspective view of embodiment of camera 116.

Turning briefly to FIGS. 10 and 11, a perspective view and a rear perspective view of an embodiment of camera 116 is shown. While camera 116 currently comprises a body 252, a lens 168, and a plug 166, the embodiment shown is also known as GM® part #84676845 and presently sold with GM® brand trucks. It is contemplated that different embodiments of cameras and camera housings 102 may be configured to hold and secure each camera type to an extension 110 via bracket 108, which allows the same bracket 108 and extension 110*f* to be utilized with a variety of camera types. Some examples of such cameras include, but are not limited to, GM® part #23295906, 84586465, 84676846, and 84884484. It is also contemplated that to accommodate a specific camera, at least one aperture may be formed therein rear wall 276 of rear camera housing 106 to allow for at least a portion of the camera to extend through the aperture (such as plug 166 for example).

A method for attaching a camera to a tire carrier (such as a hitch mounted version) includes attaching an extension 110 configured to attach to a bracket 108 on one end 120 and a tire carrier 200 on the other, attaching the bracket 108 to the extension 110, enclosing at least a portion of a camera 116 within a camera housing 102 that is rotatable, and attaching the camera housing 102 to the bracket 108.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. A camera apparatus comprising:
a camera housing at least partially enclosing a digital or analog camera comprising a body with at least two sides, the at least two sides touching the camera housing when at least partially enclosed;
a bracket attached to the camera housing; and
an extension securing to the bracket, extending through the center of a tire rim, and securing to a tire carrier,
wherein the bracket secures to the extension and allows rotation of the camera housing in relation to the extension.

2. The apparatus of claim 1 wherein the bracket is configured to attach to one end of the extension.

3. The apparatus of claim 1 wherein the camera housing further comprises a protuberance configured to secure to the bracket.

4. The apparatus of claim 3 wherein the bracket further comprises a first projection and a second projection which sandwich the protuberance.

5. The apparatus of claim 4 wherein the bracket further comprises a hook and a fin configured to communicate with the extension.

6. The apparatus of claim 5 wherein the first projection is connected to the hook and the second projection is connected to the fin.

7. The apparatus of claim 6 wherein the first projection is inline with the hook and the second projection is coplanar with the fin.

8. The apparatus of claim 5 wherein the bracket secures to the extension when the at least one fin communicates with the extension.

9. The apparatus of claim 8 wherein the bracket further comprises a first cross brace extending from the first projection to the second projection.

10. The apparatus of claim 9 wherein the bracket further comprises a second cross brace extending from the first projection to the second projection.

11. The apparatus of claim 1 wherein the camera further comprises a plug.

12. A camera apparatus comprising:
an extension which extends through the center of a tire rim and secures to a vehicle accessory;
a bracket attached to the extension;
a camera housing secured to the bracket and at least partially encloses a digital or analog camera; and
a fastener extending through the camera housing and securing the camera housing to the bracket,
wherein, the camera further comprises a body with at least two sides, the at least two sides touching the camera housing when at least partially enclosed, the bracket and the fastener allows rotation of the camera housing along at least one axis, and the fastener secures the camera housing to the bracket at an angle.

13. The camera apparatus of claim 12 wherein the bracket is configured to attach to the back of the camera housing.

14. The camera apparatus of claim 12 wherein the bracket is secured to the extension in at least two locations.

15. The camera apparatus of claim 12 wherein the vehicle accessory is a tire carrier.

16. A method for attaching a camera to a tire carrier including the steps of: attaching one end of an extension which extends through the center of a tire rim to a tire carrier, attaching a bracket to the other end of the extension, enclosing at least a portion of a camera comprising a body with at least two sides within a camera housing which touches the at least two sides and communicates with the bracket and is rotatable; and attaching the camera housing to the bracket.

* * * * *